Patented Oct. 11, 1927.

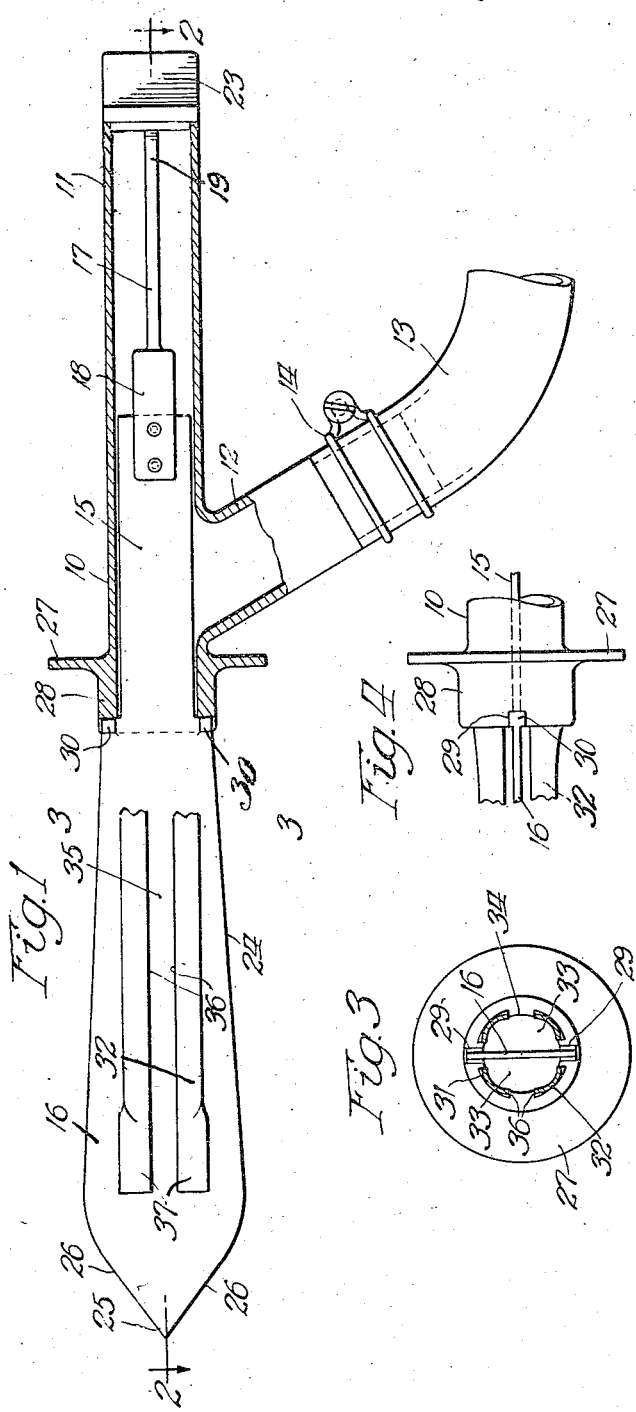

1,644,698

UNITED STATES PATENT OFFICE.

EUGENE F. WALKER, OF KANSAS CITY, MISSOURI, ASSIGNOR TO PIONEER SLAUGHTERING DEVICE COMPANY, OF KANSAS CITY, MISSOURI, A CORPORATION OF MISSOURI.

BLEEDING APPLIANCE.

Application filed April 26, 1927. Serial No. 186,700.

My invention relates to slaughtering devices, and more particularly to a bleeding appliance for use in conjunction with apparatus such as that shown in the patent to Wilson, 1,428,672, patented Sept. 12, 1922.

While a bladed appliance for this general purpose is shown in the above mentioned patent, certain difficulties have arisen in connection with the practical use of the same, which it is a purpose of my invention to overcome.

It has been found desirable to reduce the number of moving parts in the device to a minimum and to provide means closely associated with the blade of the appliance for creating a pocket in the body of the animal surrounding the knife or blade, whereby the suction is permitted to act to withdraw the blood without interference. It has been found that the flesh of the animal tends to adhere so closely to the devices previously used that access to the openings leading to the suction line is prevented, and the blood is not properly withdrawn by the suction means provided. In order to overcome this difficulty guard fingers are provided on opposite sides of the blade with which the wound in the animal is made, that are so spaced as to provide suction pockets between said fingers and the knife blade, and openings between the fingers through which the blood may pass into the space around the knife. It has been furthermore found to be desirable, to provide a large unrestricted opening around the shank of the knife blade leading into the hollow body portion of the device, so that there will be nothing to interfere with the action of the suction means connected with a suction connection leading from said hollow body portion.

It is a further purpose of the invention to provide a handle portion projecting endwise from said hollow body portion and to provide a suction connection extending at an oblique angle from the same, so that when the knife blade is inserted in the animal, which is usually done at an angle inclined to the vertical, the suction connection extends substantially vertically downwardly from the body portion of the device.

It is also a purpose of my invention to provide for the ready removal of the blade of the appliance for cleaning purposes, and to provide a rigid guard flange on the device outwardly from the blade thereof to act as a sealing means and stop to limit the insertion of the blade into the animal.

Other objects and advantages of the invention will appear as the description of the drawings proceeds. I desire to have it understood, however, that I do not intend to limit myself to the details of construction shown or described, but that I intend to include as part of my invention, all such obvious changes and modifications as would occur to a person skilled in this art and as would fall within the scope of the claims.

In the drawings:

Fig. 1 is a view partly in elevation and partly in longitudinal section of my improved bleeding appliance.

Fig. 2 is a section taken on the line 2—2 of Fig. 1.

Fig. 3 is a section taken on the line 3—3 of Fig. 1, and

Fig. 4 is a fragmentary elevational view taken at right angles to Fig. 1.

Referring in detail to the drawings, my improved bleeding appliance comprises a hollow body portion 10, having a rearwardly projecting portion 11 thereon forming a handle. A suction connection 12 communicating with the hollow body portion 10 projects at an oblique angle to the body portion 10 and has a suction hose 13 connected thereto by any suitable form of clamp 14.

Mounted within the hollow body portion 10 is a knife member 15 which has a forwardly projecting blade portion 16 and a rearwardly projecting shank portion 17, having a thickened portion 18 secured to the body portion of the knife 15 in any desired manner. The rear end of the shank portion 17 is threaded as indicated at 19, and engages with the screwthreaded opening 20 in the cap member 21 engaging with the end portion of the hollow handle portion 11. A shoulder 22 is provided on the cap 21 engaging with the edge of the handle 11, and said cap is provided with a cross bar 23 to facilitate turning of the same.

The blade 16 has the side edges 24 thereof diverging toward the pointed end thereof and terminates in a pointed end portion 25, the converging edges 26 of said pointed end 25 being bevelled as will be clear from Fig. 2 to provide a sharp edge therefor.

The body portion 10 is provided with a flange 27 extending outwardly therefrom and serving as a stop member to limit the inward movement of the blade 16 and also serving to engage with the outer edge of the wound to seal the same, so as to prevent loss of suction. The body portion 10 is thickened at 28 forwardly of the flange 27 and is provided with slots 29 receiving the thickened edges 30 of the blade 16 at the point where the shoulders are formed between the portion of the knife 15 mounted within the body portion 10 and the blade portion 16 thereof.

The forward end of the portion 28 is reduced at 31 and fingers 32 extend outwardly therefrom. A pair of the fingers 32 is provided on each side of the blade 16 said fingers serving as guard members and being spaced from said blade so as to provide pockets 33 between the side faces of the blade 16 and said fingers in communication with the hollow interior of the body portion 10 through the opening 34 in the end thereof, and thus being also in communication with the suction connection 12. Said fingers 32 are spaced so as to provide the slots 35 between the same leading into the pockets 33 through which the blood enters said pockets, and are preferably curved transversely, as shown in Fig. 3, the curvature thereof being on a slightly smaller radius than that of the outer face of the portion 28, to thus project the longitudinal edges 36 thereof inwardly beyond the central portions of said fingers. While the major portions of said guard fingers 32 are curved transversely to provide a convex face on the outer side thereof and a concave face on the inner side thereof, the extreme end portions 37 thereof are flattened so as to engage flatly with the side faces of the blade 16, the flat portions gradually merging with the curved portions thereof, as will be evident from Fig. 2. The end portions 37 are turned inwardly so that the same engage with the blade closely, but permit the sliding of the knife into and out of position within the body portion 10. The end portions 37 are inclined so as not to interfere with the insertion of the blade in the flesh of the animal, and the end portion or pointed portion of the blade 16 is not provided with a guard to facilitate insertion of the same. The fingers 32 preferably terminate substantially at the widest portion of the blade, as will be evident from the drawings.

By the arrangement set forth above the blade can be readily removed for cleaning purposes and the suction is permitted to act at a point adjacent the blade in such a manner as to obtain the full efficiency thereof at the desired point without the flesh of the animal acting as a sealing means to interfere with the same.

Having thus described my invention what I desire to claim and secure by United States Letters Patent is:

1. In a device of the character described, a chambered body portion, a suction connection leading therefrom, a blade extending from said body portion and guards lying on opposite sides of said blade through the major portion of the length of said blade.

2. In a device of the character described, a chambered body portion, a suction connection leading therefrom, a blade extending from said body portion and transversely curved guards on opposite sides of said blade.

3. In a device of the character described, a chambered body portion, a suction connection leading therefrom, a blade extending from said body portion and spaced guards extending lengthwise on opposite sides of said blade.

4. In a device of the character described, a chambered body portion, a suction connection leading therefrom, a blade extending from said body portion and guard members forming suction pockets on opposite sides of said blade.

5. In a device of the character described, a chambered body portion, a suction connection leading therefrom, a blade extending from said body portion, a pointed end on said blade and guards extending from said body portion in spaced relation to said blade to a point adjacent said pointed end.

6. In a device of the character described, a chambered body portion, a suction connection leading therefrom, a blade extending from said body portion and means on opposite sides of said blade forming suction pockets communicating with the chamber within said body portion.

7. In a device of the character described, an elongated body portion having a handle portion projecting from one end thereof, a blade projecting from the other end thereof and a suction connection extending at an oblique angle from said body portion.

8. In a device of the character described, an elongated body portion having a handle portion projecting from one end thereof, a blade projecting from the other end thereof, a rigid sealing member projecting from said body portion adjacent said blade and a suction connection leading from the chamber in said body portion.

9. In a device of the character described, an elongated body portion having a handle portion projecting from one end thereof, a blade projecting from the other end thereof, a flange projecting laterally from said body portion adjacent said blade and a suction connection leading from the chamber in said body portion.

10. In a device of the character described, a chambered body portion, a suction connection leading therefrom, a blade extending from said body portion and guards on opposite sides of said blade, said blade being removable from said body portion.

11. In a device of the character described, a chambered body portion, a suction connection leading therefrom, a blade extending from and having a shank portion detachably connected with said body portion, and guards on opposite sides of said blade.

12. In a device of the character described, an elongated body portion having a handle portion projecting from one end thereof, a blade projecting from the other end thereof, and means detachably supporting said blade within said body portion.

13. In a device of the character described, an elongated body portion having a handle portion projecting from one end thereof, a blade projecting from the other end thereof, means carried by said handle portion for detachably supporting said blade within said body portion and a suction connection leading from said body portion between the ends thereof.

14. In a device of the character described, a hollow body portion having an open end, a knife having a blade portion projecting endwise from the open end of said body portion, a suction connection leading from said hollow body portion and guard means on opposite sides of said blade and spaced therefrom.

15. In a device of the character described, a hollow body portion having an open end, a knife detachably mounted in said body portion and having a blade portion projecting endwise from the open end of said body portion, a suction connection leading from said hollow body portion and guard means extending lengthwise on opposite sides of said blade and spaced therefrom.

16. In a device of the character described, a hollow body portion having an open end, a knife having a blade portion projecting endwise from the open end of said body portion, a suction connection leading from said hollow body portion and pairs of fingers extending substantially parallel to and spaced from the opposite sides of said blade and terminating in inclined end portions approaching said blade.

17. In a device of the character described, a hollow body portion having an open end, a knife having a blade portion projecting endwise from the open end of said hollow body portion, a suction connection leading from said hollow body portion and pairs of spaced fingers lying on opposite sides of said blade through the major portion thereof and spaced therefrom.

18. In a device of the character described, a chambered body portion, a suction connection leading therefrom, a blade extending from said body portion and guards on opposite sides of said blade, said blade being detachably mounted in and having means engaging said body portion to hold said blade against rotation relative to said body portion.

In testimony whereof, I hereunto subscribe my name this 21st day of April, 1927.

EUGENE F. WALKER.